(No Model.)
O. S. RICHMOND.
PULVERIZER.
No. 313,953.  Patented Mar. 17, 1885.
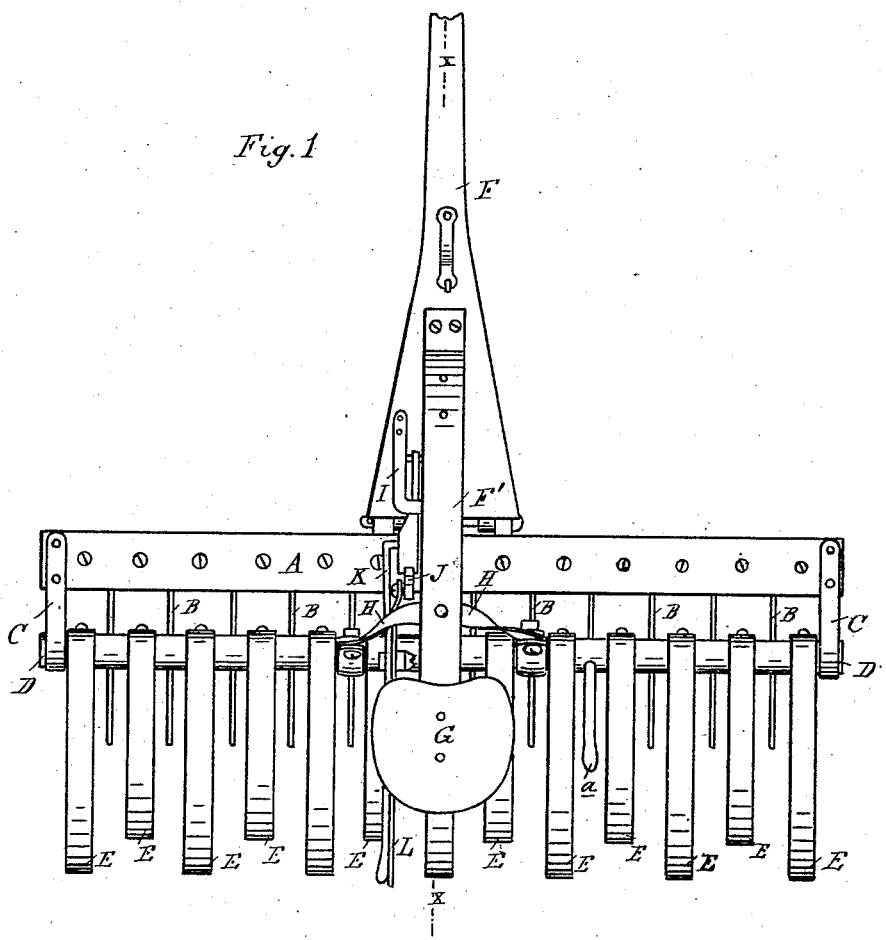
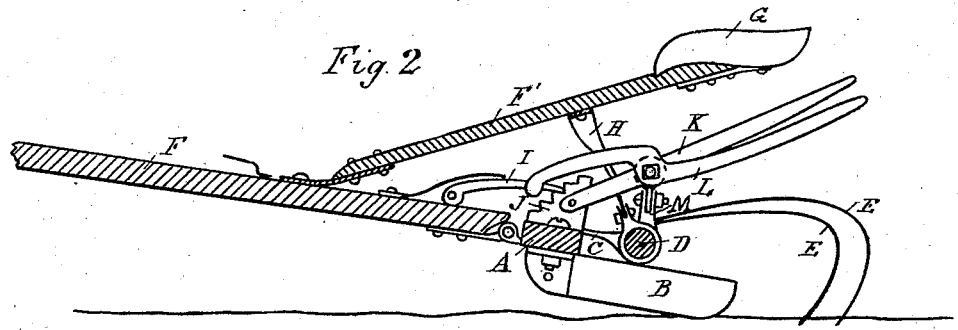
Attest
J. Paul Mayer
E. Scully
Inventor
Orrin S. Richmond
By Thos. S. Sprague Atty

UNITED STATES PATENT OFFICE.

ORRIN S. RICHMOND, OF ADAIR, MICHIGAN.

PULVERIZER.

SPECIFICATION forming part of Letters Patent No. 313,953, dated March 17, 1885.

Application filed July 23, 1884. (No model.)

*To all whom it may concern:*

Be it known that I, ORRIN S. RICHMOND, of Adair, in the county of St. Clair and State of Michigan, have invented new and useful Improvements in Pulverizers; and I do hereby declare that the following is a full, clear, and exact description thereof, reference being had to the accompanying drawings, which form a part of this specification.

This invention relates to certain new and useful improvements in the construction of land-pulverizers; and the invention consists in the peculiar construction and application of cutters and means for adjusting the same, and in the peculiar construction, arrangement, and various combinations of the parts, all as more fully hereinafter set forth.

In the accompanying drawings, Figure 1 is a plan view of my improved device. Fig. 2 is a cross-section on the line $x\ x$.

A represents a suitable bar, to which I secure upon its under side the rearwardly-projecting cutter-blades B at suitable distances apart. At each end of the bar A, I secure brackets C, in the free ends of which the ends of the rock-shaft D are properly journaled. This rock-shaft has secured to it a series of spring cultivator-teeth, E.

F is a tongue which is pivotally secured to the front side of the bar A, and to which the draft is applied. Secured to this tongue or pole is a seat-bar, F', the free end of which carries a seat, G. This seat-bar F' rests upon brace-rods H, the lower ends of which are secured in any proper manner to the rock-shaft D, so as not to prevent its partial rotation.

I is a spring-dog pivoted at one end to the tongue, while its free end rests upon a ratchet-standard, J, upon the bar A. K and L are two levers fulcrumed upon the standard M, the short arm of the lever K being pivoted to the standard J, while the corresponding arm of the lever L projects beneath the spring-dog.

In practice, where the ground to be operated upon is not very lumpy and is free from sod, the cutter-blades are adjusted so as to run nearly horizontal; but where the ground is lumpy or hard, the cutter-blades should be adjusted so as to raise their forward ends, and thus compel them to make more of a shearing cut. It will be observed that the weight of the driver when upon the seat is thrown upon the rock-shaft, thus compelling the cultivator to perform its work, while at the same time the weight is taken from off the necks of the animals.

When it is not desired to use the cultivator-teeth, as in going from one field to another, the operator turns the rock-shaft up by means of the handle $a$, so as to clear the teeth from the ground, where they may be secured by a proper catch on the seat.

What I claim as my invention is—

1. In a pulverizer, the combination of the bar A, cutter-blades B, carried by said bar, brackets C, attached to the ends of said bar, rock-shaft D, journaled in said brackets, teeth E, tongue F, pivoted to the bar A, seat G, spring-dog I, standard M, levers K L, fulcrumed on said standard, and the handle $a$, attached to said bar, all constructed, arranged, and operating substantially as and for the purposes set forth.

2. The combination of the bar A, carrying cutter-blades B, tongue F, pivoted to said bar, ratchet-standard J, secured to said bar, spring-dog I, pivoted to said tongue, brackets C, rock-shaft D, journaled in said brackets, standard M, and levers K L, fulcrumed on said standard, the short arm of the lever K being pivoted to the standard J, and the short arm of the lever L operating on the dog I, substantially as and for the purpose specified.

ORRIN S. RICHMOND.

Witnesses:
H. S. SPRAGUE,
E. SCULLY.